(12) United States Patent
Park et al.

(10) Patent No.: US 10,070,443 B2
(45) Date of Patent: Sep. 4, 2018

(54) METHOD AND APPARATUS FOR UNLICENSED COMMUNICATIONS BAND ACCESS

(71) Applicant: Sharp Laboratories of America, Inc., Camas, WA (US)

(72) Inventors: Kenneth James Park, Cathlamet, WA (US); John Michael Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 224 days.

(21) Appl. No.: 14/862,291

(22) Filed: Sep. 23, 2015

(65) Prior Publication Data
US 2016/0095125 A1    Mar. 31, 2016

Related U.S. Application Data

(60) Provisional application No. 62/055,114, filed on Sep. 25, 2014, provisional application No. 62/086,631, filed on Dec. 2, 2014.

(51) Int. Cl.
*H04W 72/04* (2009.01)
*H04W 8/02* (2009.01)
(Continued)

(52) U.S. Cl.
CPC ......... *H04W 72/0486* (2013.01); *H04L 5/001* (2013.01); *H04L 27/0006* (2013.01); *H04W 8/02* (2013.01); *H04W 52/04* (2013.01); *H04W 64/00* (2013.01); *H04W 72/02* (2013.01); *H04W 72/0453* (2013.01); *H04W 74/085* (2013.01);
(Continued)

(58) Field of Classification Search
None
See application file for complete search history.

(56) References Cited

U.S. PATENT DOCUMENTS 6,556,825 B1    4/2003   Mansfield
8,086,239 B2   12/2011   Elmaleh
(Continued)

FOREIGN PATENT DOCUMENTS

| WO | 2013/086659 A1 | 6/2013 |
| WO | 2013/126858 A1 | 8/2013 |
| WO | 2013/167557 A1 | 11/2013 |

OTHER PUBLICATIONS

International Search Report and Written Opinion dated Dec. 22, 2015 in PCT Application No. PCT/US2015/51624.
(Continued)

*Primary Examiner* — Mohammad Adhami
*Assistant Examiner* — Raul Rivas
(74) *Attorney, Agent, or Firm* — Nixon & Vanderhye P.C.

(57) ABSTRACT

A wireless terminal device (30) is capable of operating both in a licensed radio frequency band and an unlicensed radio frequency band. The wireless terminal device (30) comprises processor circuitry (40) configured (1) to select a first requirement comprising at least a first rule governing utilization of the unlicensed radio frequency band and (2) to use a second requirement comprising at least a second rule for implementing the first rule of the selected first requirement. The first requirement may be a regional requirement and the second requirement may be an operator requirement.

18 Claims, 9 Drawing Sheets

(51) Int. Cl.
*H04W 72/02* (2009.01)
*H04W 52/04* (2009.01)
*H04W 74/08* (2009.01)
*H04L 27/00* (2006.01)
*H04W 64/00* (2009.01)
*H04L 5/00* (2006.01)
*H04W 72/00* (2009.01)
*H04W 88/06* (2009.01)
*H04W 60/00* (2009.01)

(52) U.S. Cl.
CPC ............ *H04L 5/0007* (2013.01); *H04W 60/00* (2013.01); *H04W 72/00* (2013.01); *H04W 88/06* (2013.01)

(56) References Cited

U.S. PATENT DOCUMENTS

| | | |
|---|---|---|
| 8,774,209 B2 | 7/2014 | Sadek et al. |
| 2004/0198356 A1 | 10/2004 | Dunlop et al. |
| 2006/0009219 A1 | 1/2006 | Jaakkola et al. |
| 2007/0060158 A1* | 3/2007 | Medepalli ............ H04W 72/085 455/450 |
| 2011/0195667 A1 | 8/2011 | Hassan et al. |
| 2013/0188552 A1 | 7/2013 | Kazmi et al. |
| 2013/0322279 A1 | 12/2013 | Chincholi et al. |

OTHER PUBLICATIONS

IEEE Std 802.11ac™—2013, IEEE Standard for Information Technology—Telecommunications and information exchange between systems Local and Metropolitan area networks—Specific requirements; Part 11: Wireless LAN Medium Access Control (MAC) and Physical Layer (PHY) Specifications; Amendment 4: Enhancements for Very High Throughput for Operation in Bands Below 6 GHz' IEEE Computer Society, 2013.

RP-122009, 3GPP TSG RAN Meeting #58, Qualcomm Incorporated, "Study on LTE Device to Device Proximity Services", Dec. 2012.

* cited by examiner

Fig. 8A

Bank of Regional Requirements (RSRs) 52B'

| REGION DESCRIPTION | RSR RULES | LAST UPDATE TIME | REGIONAL AUTHORITY ID | |
|---|---|---|---|---|
| $MCC_1, MNC_1$ | $rules_1$ | $time_1$ | $auth\_ID_1$ | $62_1$ |
| $MCC_1, MNC_2$ | $rules_2$ | $time_2$ | $auth\_ID_2$ | $62_2$ |
| ... | ... | ... | ... | |
| $MCC_i, MNC_i$ | $rules_i$ | $time_i$ | $auth\_ID_i$ | $62_i$ |

Bank of Regional Requirements (RSRs) 52B"

| REGION DESCRIPTION | RSR RULES | LAST UPDATE TIME | REGIONAL AUTHORITY ID | MCC and/or MNC | |
|---|---|---|---|---|---|
| $region_1$ | $rules_1$ | $time_1$ | $auth\_ID_1$ | $MCC_1, MNC_1; MCC_1, MNC_2$ | $62_1$ |
| $region_2$ | $rules_2$ | $time_2$ | $auth\_ID_2$ | $MCC_2, MNC_1$ | $62_2$ |
| ... | ... | ... | ... | ... | |
| $region_i$ | $rules_i$ | $time_i$ | $auth\_ID_i$ | $MCC_i, MNC_1$ | $62_i$ |

$66_1$ $66_2$ $66_3$ $66_4$ $66_5$

METHOD AND APPARATUS FOR UNLICENSED COMMUNICATIONS BAND ACCESS

This application claims the priority and benefit of (1) U.S. Provisional Patent Application 62/055,114, filed Sep. 25, 2014, entitled "METHOD AND APPARATUS FOR UNLICENSED COMMUNICATIONS BAND ACCESS", and (2) U.S. Provisional Patent Application 62/086,631, filed Dec. 2, 2014, entitled "METHOD AND APPARATUS FOR UNLICENSED COMMUNICATIONS BAND ACCESS", both of which are incorporated herein by reference in their entirety.

TECHNICAL FIELD

The technology relates to wireless communications, and particularly to method and apparatus for use of unlicensed radio frequencies by wireless terminals which generally operate in a cellular network using licensed radio frequencies.

BACKGROUND

In a cellular network a wireless terminal communicates with a base station over a radio or air interface using radio frequencies which are licensed to operator(s) of the cellular network. For example, in a radio technology known as Long Term Evolution (LTE), a Third Generation Global Partners (3GPP) standardized radio access technology, a wireless terminal known as a user equipment (UE) communicates over a licensed frequency spectrum with a base station known as an eNodeB or eNB. In view of increasing traffic demand, cellular operators need more radio frequency spectrum than that presently licensed for their particular radio access technology.

Although a licensed spectrum is preferred by the cellular operators to provide guaranteed quality of service (QoS) to the user, an unlicensed spectrum may be considered as an effective complement to the licensed spectrum. Examples of unlicensed spectrum include Wi-Fi and Industrial, Scientific, and Medical (ISM) radio frequency bands.

Wi-Fi, also spelled Wifi or WiFi, is a local area wireless technology that allows an electronic device to exchange data or connect to the internet using 2.4 GHz UHF and 5 GHz super high frequency (SHF) radio waves. The Wi-Fi Alliance defines Wi-Fi as any "wireless local area network (WLAN) products that are based on the Institute of Electrical and Electronics Engineers' (IEEE) 802.11 standards". The ISM bands are reserved internationally for the use of radio frequency (RF) energy for industrial, scientific and medical purposes other than telecommunications. The ISM bands are defined by the International Telecommunication Unit (ITU-R) in 5.138, 5.150, and 5.280 of the Radio Regulations. Table 1 shows that the rules and regulation for using the ISM bands (e.g., 2.4 GHZ and 5 Ghz) are not standardized worldwide.

TABLE 1

| | | 2.4 GHz | 5150-5250 | 5250-5350 | 5470-5725 | 5725-5850 |
|---|---|---|---|---|---|---|
| USA | Legacy Systems | Wi-Fi, BT, cordless, . . . | | Wi-Fi | | Wi-Fi |
| | Rules Protecting incumbent | N/A | N/A* | | DFS/TPC | No DFS |
| | Co-exist with Legacy | | FCC Part 15.247, 153.401-407, max Tx power and emission mask | | | |
| EU | Legacy Systems | Wi-Fi, BT, cordless, . . . | | Wi-Fi | | In planning, Non-specific SRD may operate at 25 mW eirp |
| | Rules Protecting incumbent | N/A | Indoor only | Indoor only for 5250-5350, DFS/TPC | | |
| | Co-exist with Legacy | | LBT, max Tx power and emission mask | | | |
| China | Legacy Systems | Wi-Fi, BT, cordless, . . . | | Wi-Fi | TBD | Lightly licensed, Wi-Fi, P2MP |
| | Rules Protecting incumbent | N/A | Indoor only | Indoor only, DFS/TPC | | N/A |
| | Co-exist with Legacy | | Max Tx power and emission mask | | | Max EIRP: 25 mW, 2 W |
| Japan | Legacy Systems | Wi-Fi, BT, cordless, . . . | | Wi-Fi | Wi-Fi | DSRC (5770-5850), ISM equipment (no radio com) |
| | Rules Protecting incumbent | N/A | Indoor only | Indoor only with DFS/TPC | DFS/TPC | N/A |
| | Co-exist with Legacy | LBT, Max. conducted power and antenna gain, emission mask defined for each system | | | | ISM, DSRC: Max. conducted power and EIRP, emission mask |
| Korea | Legacy Systems | Wi-Fi, BT, cordless, . . . | | Wi-Fi | Wi-Fi (5470-5650), broadcasting relay system(5650-5725) | Wi-Fi (5725-5825), DSRC(5835-2855) |
| | Rules Protecting incumbent | N/A | Indoor only | DFS/TPC | DFS/TPC (5470-5650) | N/A |
| | Co-exist with Legacy | | Max. conducted power and antenna gain, spurious emission defined for each system | | | |

Use of unlicensed spectrum by a wireless terminal which is suited for use in cellular network may be complicated. If, for example, LTE is deployed in unlicensed spectrum (e.g. 2.4 GHz ISM), coexistence with existing users of the unlicensed spectrum (e.g., IEEE 802.11ac . . . Wi-Fi) needs to be carefully considered to ensure that existing users of the shared unlicensed spectrum are not negatively impacted by the use of the unlicensed spectrum by LTE, e.g., by LTE wireless terminals.

Wi-Fi uses a CSMA/CA (Carrier Sense Multiple Access/Collision Avoidance) to avoid collisions between transmitting nodes by transmitting only when the channel is sensed to be "idle". CSMA is based on the principle of "sense before transmit" or "listen before talk" (LBT). The node wanting to "talk" determines that the channel is idle by first listening to the shared spectrum (e.g., listening for wireless signals in a wireless network) to determine whether another node is transmitting or not. If another node was heard, the listening node will wait for a period of time for the transmitting node to stop transmitting before listening again for a free communications channel. If the listening node determines the shared spectrum as being clear the listening node begins its transmission on the shared spectrum.

An LTE user equipment (UE) uses a RACH (Random Access Channel) to gain access to network resources when in an idle state. The RACH is used to initially synchronize the UE's transmission with the eNB. It is a shared channel that is used by all UEs to access the network. A feature of a RACH channel is that messages are not scheduled. There is no certainty that only a single device makes a connection attempt at one time, so collisions can result.

In LTE, cell synchronization is the early step taken by a UE when it attempts to camp on any cell. From the synchronization process, the UE acquires the Physical Cell Identity (PCI), time slot, and frame synchronization of that cell, which will enables the UE to decode and read fundamental data (e.g. PCFICH, PDCCH etc) and UE-specific (PDSCH) data from the cell. If the UE is attempting to acquire/tune a specific band/channel, the UE first finds the primary synchronization signal (PSS). The primary synchronization signal (PSS) is located in the last OFDM symbol of first time slot of the first subframe (subframe 0) of the radio frame. This enables the UE to be synchronized on subframe level. The PSS is repeated in subframe 5, which means UE is synchronized on 5 ms basis since each subframe is 1 ms. From the PSS the UE is also able to obtain a physical layer identity (0 to 2). In another step the UE finds the secondary synchronization signal (SSS). The SSS symbols are also located in the same subframe of PSS but in the symbol before PSS. From the SSS the UE is able to obtain physical layer cell identity group number (0 to 167). Using both the physical layer identity and the cell identity group number, the UE determines the PCI for the cell to which the UE is tuned. In LTE there are 504 PCIs allowed and are divided into unique 168 cell layer identity groups, where each group consist of three physical layer identities. Assuming physical layer identity=1 and cell identity group=2 then the PCI for given cell is determined from Expression 1.

PCI=3*(Physical layer cell identity group)+physical layer identity=3*2+1=7       Expression 1:

It is expected that there will be at least two differentiating use cases regarding how the UE will access unlicensed radio frequency bands. A first use case is also known as the "Non-Stand Alone" case; a second use case is also known as the "Stand Alone Unlicensed" case.

In the first case ("Non-Stand Alone" case) the UE will always be connected to the LTE network via a P-Cell (Primary Cell). The P-Cell operates on spectrum licensed to the operator. The P-Cell provides the UE with configuration data regarding how and when the UE will access the RF resources of the unlicensed band. The resources of the unlicensed band will be configured as an LTE eNB and may be considered as a S-Cell (Secondary or Small Cell). In the first use case, the P-Cell may either be co-located with the S-Cell (as shown in FIG. 1A), or the P-Cell and S-Cell may not be co-located but with the S-Cell in the coverage of the P-Cell and with the S-Cell and P-Cell have some logical connection (as shown in FIG. 1B).

In the second use case ("Stand Alone Unlicensed" case) the UE may, or may not, be connected to the LTE network. The resources of the unlicensed band may be configured as an LTE eNB and may be considered by the UE as a U-Cell (Unlicensed Cell) operating in spectrum that is not licensed to the operator. The U-Cell may have a connection to an operator's network (via a direct connection or via an internet connection) [as shown in FIG. 2A]; may have no connection to an operator's network [as shown in FIG. 2B]; or may have an internet connection. As shown in FIG. 2B, the U-Cell may be within P-cell coverage but there is no direct connection (wired or wireless interface) between the U-Cell and the P-Cell. The P-Cell of FIG. 1B is able to exert forms of control and access with respect to the U-Cell that are not otherwise available with the same latency in the FIG. 2B case.

It is expected that for the first case ("Non-Stand Alone" case) the P-Cell will provide the UE with all the necessary information regarding access to the S-Cells operating on unlicensed spectrum in the P-Cell coverage area. This information may be either broadcasted by the P-Cell (e.g., via system information block (SIB) message), or the P-Cell may directly configure the UE (e.g., via a Radio Resource Control (RRC) message).

It is expected that for the second use case ("Stand Alone Unlicensed" case) the UE will have been provisioned with Regional Specific Rules regarding how the UE may access a standalone U-Cell operating on unlicensed spectrum. The provisioning may have been done at time of UE manufacture, or may have been done by the LTE network (at some previous connection with the network), or may have been done at time of UE manufacture and then subsequently updated by the LTE network.

One of the key differentiators between the first case ("Non-Stand Alone" case) and the second use case ("Stand Alone Unlicensed" case) is that in use case 2 the UE may not have network connection to obtain guidance on how to access the unlicensed U-Cell. Thus the UE must rely upon pre-provisioned information or information provided outside the cellular air interface regarding the rules for access to the unlicensed bands per each region. In addition the UE must rely on its location determination mechanism to further determine what pre-provisioned regional rules should be applied to access the unlicensed band.

Depending on the regulatory conditions of a specific region, the use of radio frequency (RF) resources in an unlicensed band may require that a UE always use specific RF resource access rules and RF resource transmit (Tx) power settings. In one example, when using the ISM bands, the use a CSMA/CA approach as a means to co-exist with legacy systems such as Wi-Fi and Bluetooth may be required. If the regulatory conditions of a region do not require the use of CSMA/CA to access the RF resources of an unlicensed band, the UE may still want to use CSMA/CA access to ensure that fair or efficient usage of the resources if other users are currently active on the band. However, if there are no other active users in the unlicensed band in a region where the regulatory conditions do not require the use of CSMA/CA, then the UE may want to not use CSMA/CA, and instead use a LTE access protocol. In another example, the use of TV White Space bands (TVWS) may require specific Tx power settings. Furthermore, it would be useful to have a single standardized solution or algorithm to enable a UE to roam internationally and still take advantage of unlicensed LTE spectrum despite the varying regulatory landscape of different countries.

SUMMARY

In one of its aspects the technology disclosed herein concerns a wireless terminal device capable of operating both in a licensed radio frequency band and an unlicensed radio frequency band. The wireless terminal device comprises processor circuitry configured to select radio resources based on specified rules or requirements, and method for operating such wireless terminal devices.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 8A is a diagrammatic view depicting example structure and contents of portions of a memory for a wireless terminal in accordance with a first implementation for the example embodiment of FIG. 7.

FIG. 8B is a diagrammatic view depicting example structure and contents of portions of a memory for a wireless terminal in accordance with a second implementation for the example embodiment of FIG. 7.

DETAILED DESCRIPTION

Figure 1A:
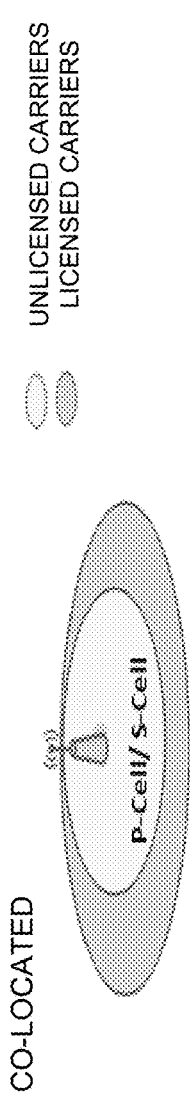
FIG. 1A and FIG. 1B are diagrammatic views of a first case ("Non-Stand Alone" case) in which a UE is always connected to a network via a P-Cell (Primary Cell), with FIG. 1A showing a P-Cell co-located with an S-Cell (Secondary Cell) and FIG. 1B showing a P-Cell not being co-located with a S-Cell.
Figure 1B:
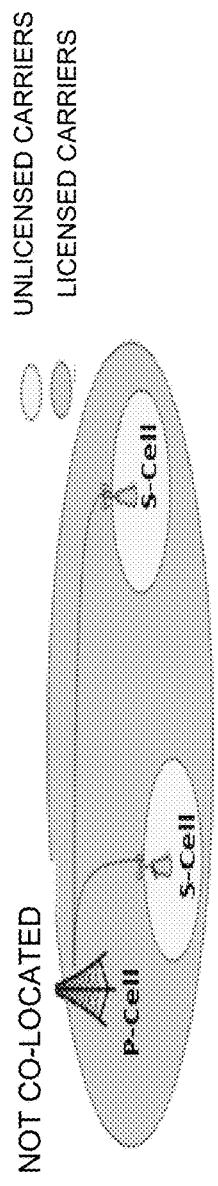

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "device-to-device ("D2D") communication" can refer to a mode of communication between or among wireless terminals that operate on a cellular network or other telecommunications system in which the communication data traffic from one wireless terminal to another wireless terminal does not pass through a centralized base station or other device in the cellular network or other telecommunications system. The "device-to-device (D2D) communication" encompasses one or both of D2D signaling (e.g., D2D control information) and D2D data. "Device-todevice ("D2D") communication may also be known as "sidelink direct" communication (e.g., sidelink communication). The term "sidelink direct" may also be shortened to "sidelink", abbreviated as "SL", and as such "sidelink" may be used herein to refer to sidelink direct. Yet further, the term "ProSe" (Proximity Services) direct communication may be used in lieu of sidelink direct communication or device-to-device (D2D) communication. Therefore, it is to be understood that herein the terms "sidelink direct", "sidelink" (SL), "ProSe" and "device-to-device (D2D)" may be interchangeable and synonymous.

Thus, as mentioned above, device-to-device (D2D) or sidelink direct communication differs from "WAN" or "Cellular communication" which is or involves communication between the base station and the wireless terminal. In device-to-device (D2D) communication, communication data is sent using communication signals and can include voice communications or data communications intended for consumption by a user of a wireless terminal Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

Device-to-device (D2D) communication, e.g., sidelink direct communication, may be used in networks implemented according to any suitable telecommunications standard. A non-limiting example of such as standard is the 3rd Generation Partnership Project ("3GPP") Long Term Evolution ("LTE"). The 3GPP standard is a collaboration agreement that aims to define globally applicable technical specifications and technical reports for present and future generation wireless communication systems. The 3GPP may define specifications for next generation mobile networks, systems, and devices. The 3GPP LTE is the name given to a project to improve the Universal Mobile Telecommunications System ("UMTS") mobile phone or device standard to cope with future requirements. In one aspect, UMTS has been modified to provide support and specification for the Evolved Universal Terrestrial Radio Access ("E-UTRA") and Evolved Universal Terrestrial Radio Access Network ("E-UTRAN"). E-UTRAN is another non-limiting example of a telecommunications standard with which SL communication may be used. An aspect of the 3GPP work pertains to functionality to allow sidelink direct communication to enable Proximity Services (ProSe) for public safety and, certain non-public safety requirements (See, e.g., RP-122009).

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" and/or "wireless terminal device" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

In one of its aspects the technology disclosed herein concerns a wireless terminal device capable of operating both in a licensed radio frequency band and an unlicensed radio frequency band. The wireless terminal device comprises processor circuitry configured (1) to select a first requirement comprising at least a first rule governing utilization of the unlicensed radio frequency band and (2) to use a second requirement comprising at least a second rule for implementing the first rule of the selected first requirement.

In an example embodiment and mode the processor circuitry is configured to select the first requirement in dependence on location of the wireless terminal.

In an example embodiment and mode the location of the wireless terminal may be determined based on most recent network information including one or both of most recent mobile country code (MCC) and most recent mobile network code (MNC). The most recent network information may be utilized as a primary way of determining the location of the wireless terminal, or a secondary/corroborative way of determining the location of the wireless terminal. In differing implementations, the most recent network information may either serve as a primary information for determining the location of the wireless terminal or a secondary/corroborative way for determining the location of the wireless terminal.

In an example embodiment and mode the processor circuitry is configured to select the first requirement from a set of alternative first requirements stored in a memory accessible by the processor circuitry. Plural requirements of the set of alternative first requirements are associated with respective different geographical areas.

In an example embodiment and mode, when plural requirements of the set of first requirements are associated with a same geographical area, the processor circuitry is configured to select the first requirement from a most recently updated first requirement associated with the same geographical area.

In an example embodiment and mode the plural requirements of the set of alternative first requirements are defined by respective regional authorities which govern unlicensed frequency band usage in the respective different geographical areas.

In an example embodiment and mode the processor circuitry is configured to select the first requirement from a set of alternative first requirements stored in a memory accessible by the processor circuitry. When plural requirements of the set of alternative first requirements are associated with respective different regional authorities but also a same location of the wireless terminal, the processor is configured to request that the wireless terminal be provided with an updated first requirement.

In an example embodiment and mode the processor circuitry is configured to select the second requirement in dependence on identity of a network operator having a subscription agreement concerning the wireless terminal.

In an example embodiment and mode the processor circuitry is configured to select the second requirement from a set of alternative second requirements stored in a memory accessible by the processor circuitry. Plural requirements of the set of second requirements are associated with respective different network operators.

In an example embodiment and mode the processor circuitry is configured to select the second requirement from a set of alternative second requirements stored in a memory accessible by the processor circuitry. Plural requirements of the set of second requirements are associated with respective different operational states of the wireless terminal relative to the network operator.

In an example embodiment and mode the processor circuitry is configured to select either a home operational state or a roaming operational from the set of alternative second requirements.

In an example embodiment and mode the second requirement comprises a control parameter which the processor circuitry uses for interpreting the at least one rule of the first requirement.

In an example embodiment and mode the control parameter comprises one or more of the following: a measurement type for the unlicensed radio frequency band; a measurement threshold for the unlicensed radio frequency band; and a measurement duration for the unlicensed radio frequency band.

In an example embodiment and mode the first requirement is a regional requirement comprising at least the first rule governing utilization of the unlicensed radio frequency band in a geopolitical region associated with the regional requirement and the second requirement is a network operator requirement.

In an example embodiment and mode the wireless terminal further comprises a transceiver configured to transmit and/or receive radio frequency communications over the unlicensed radio frequency band using the first rule as implemented according to the second rule.

In an example embodiment and mode the processor circuitry is configured to select the first requirement and to use the second requirement for implementing the first rule of the selected first requirement when the wireless terminal is not under control of a primary cell of a licensed network.

In another of its aspects the technology disclosed herein concerns a method in wireless terminal device capable of operating both in a licensed radio frequency band and an unlicensed radio frequency band. In a basic mode the method comprises (1) selecting a first requirement comprising at least a first rule governing utilization of the unlicensed radio frequency band; and (2) using a second requirement comprising at least a second rule for implementing the first rule of the selected first requirement.

In an example mode the method further comprises selecting the first requirement in dependence on location of the wireless terminal.

In an example embodiment and mode the location of the wireless terminal may be determined based on most recent network information including one or both of most recent mobile country code (MCC) and most recent mobile network code (MNC). The most recent network information may be utilized as a primary way of determining the location of the wireless terminal, or a secondary/corroborative way of determining the location of the wireless terminal. In differing implementations, the most recent network information may either serve as a primary information for determining the location of the wireless terminal or a secondary/corroborative way for determining the location of the wireless terminal.

In an example mode the method further comprises selecting the first requirement from a set of alternative first requirements stored in a memory accessible by the processor circuitry, and wherein plural requirements of the set of alternative first requirements are associated with respective different geographical areas.

In an example mode, when plural requirements of the set of first requirements are associated with a same geographical area, the method further comprises selecting the first requirement from a most recently updated first requirement associated with the same geographical area.

In an example mode, the plural requirements of the set of alternative first requirements are defined by respective regional authorities which govern unlicensed frequency band usage in the respective different geographical areas.

In an example mode the method further comprises: selecting the first requirement from a set of alternative first requirements stored in a memory accessible by the processor circuitry; and, when plural requirements of the set of alternative first requirements are associated with respective different regional authorities but also a same location of the wireless terminal, requesting that the wireless terminal be provided with an updated first requirement.

In an example mode the method further comprises selecting the second requirement in dependence on identity of a network operator having a subscription agreement concerning the wireless terminal.

In an example mode the method further comprises selecting the second requirement from a set of alternative second requirements stored in a memory accessible by the processor circuitry. Plural requirements of the set of second requirements are associated with respective different network operators.

In an example mode the method further comprises: selecting the first requirement from a set of alternative first requirements stored in a memory accessible by the processor circuitry; and, when plural requirements of the set of alternative first requirements are associated with respective different regional authorities but also a same location of the wireless terminal, requesting that the wireless terminal be provided with an updated first requirement.

In an example mode the method further comprises selecting the second requirement in dependence on identity of a network operator having a subscription agreement concerning the wireless terminal.

In an example mode the method further comprises selecting the second requirement from a set of alternative second requirements stored in a memory accessible by the processor circuitry, and wherein plural requirements of the set of second requirements are associated with respective different network operators.

In an example mode the method further comprises: selecting the second requirement from a set of alternative second requirements stored in a memory accessible by the processor circuitry; and wherein plural requirements of the set of second requirements are associated with respective different operational states of the wireless terminal relative to the network operator.

In an example mode the method further comprises selecting either a home operational state or a roaming operational from the set of alternative second requirements.

In an example mode the second requirement comprises a control parameter and the method further comprises using the control parameter for interpreting the at least one rule of the first requirement.

In an example mode the control parameter comprises one or more of the following: a measurement type for the unlicensed radio frequency band; a measurement threshold for the unlicensed radio frequency band; and a measurement duration for the unlicensed radio frequency band.

In an example mode the first requirement is a regional requirement comprising at least the first rule governing utilization of the unlicensed radio frequency band in a geopolitical region associated with the regional requirement and wherein the second requirement is a network operator requirement.

In an example mode the method further comprises transmitting and/or receiving radio frequency communications over the unlicensed radio frequency band using the first rule as implemented according to the second rule.

In an example mode the method further comprises selecting the first requirement and using the second requirement for implementing the first rule of the selected first requirement when the wireless terminal is not under control of a primary cell of a licensed network.

Figures 3A, 4A:
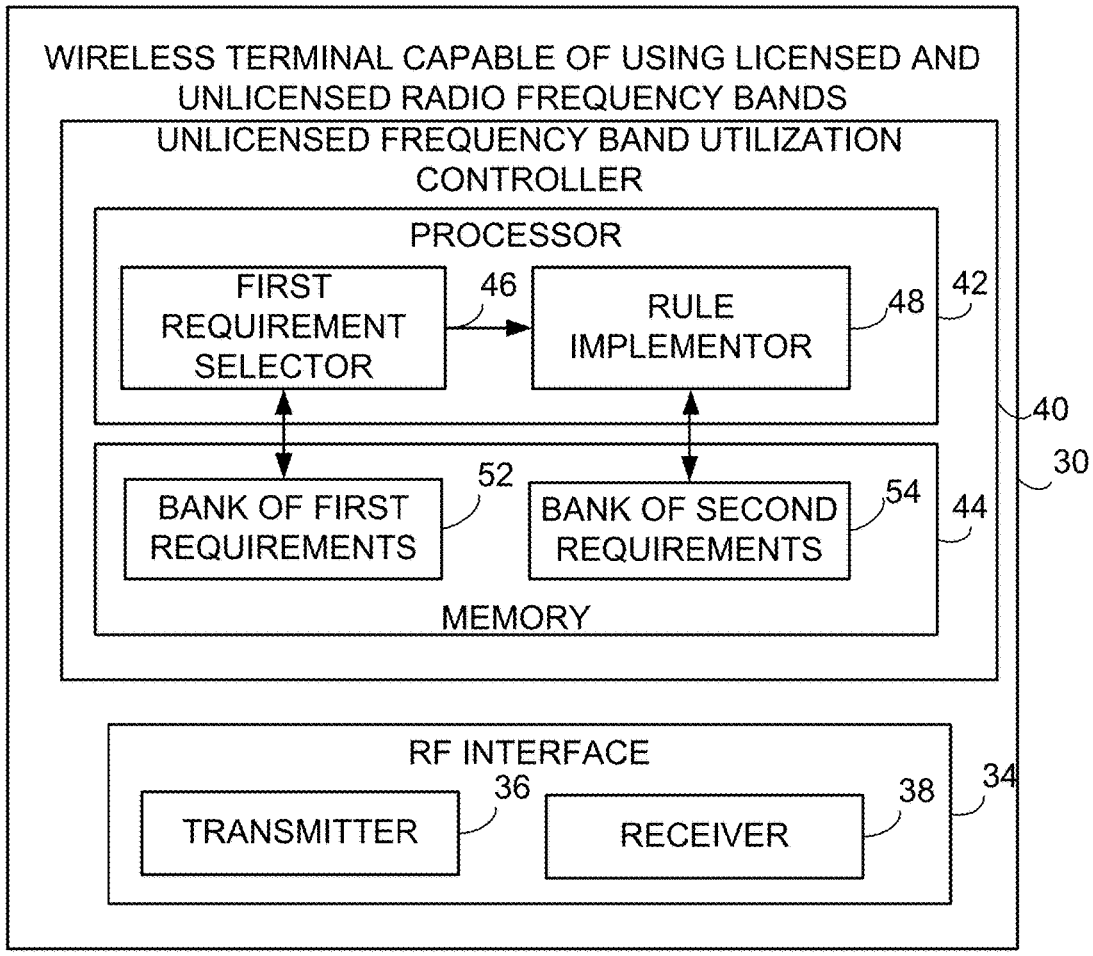
FIG. 3A is a schematic view of a wireless terminal according to an example generic embodiment which utilizes a first requirement and a second requirement.
FIG. 4A is a flowchart depicting basic, example acts or steps involved in a generic method of operating a wireless terminal of FIG. 3A.

FIG. 3A shows an example wireless terminal 30 which is capable of operating both in a licensed radio frequency band and an unlicensed radio frequency band. Since wireless terminal 30 has the capability of operating in the licensed radio frequency band, in some respects wireless terminal 30 includes a cellular device which may communicate with a cellular network. Accordingly, although not necessarily completely shown in FIG. 3A, wireless terminal 30 has functionalities that facilitate radio frequency communication using a frequency band licensed to the cellular network operator which has a subscription agreement, or which is in contractual privity with another cellular network having a subscription agreement, affecting the cellular service provided for wireless terminal 30.

Among the functionalities shown in FIG. 3A for wireless terminal 30 is radio frequency (RF) interface 34, which comprises RF transmitter 36 and RF receiver 38. The radio frequency (RF) interface 34 typically comprises units generally found in a RF front end, including (on the transmitter side) amplifiers, modulators, encoders, etc. and (on the receiver side) amplifiers, filters, and demodulators, decoders, time and frequency synchronization circuitry and on both transmitter and receiver additional control logic circuitry that governs the way the transmitter and receiver are used to access the cellular network (outside of unlicensed frequency band utilization controller 40). Each of RF transmitter 36 and RF receiver 38 are understood to comprise one or more antenna.

Figure 10:
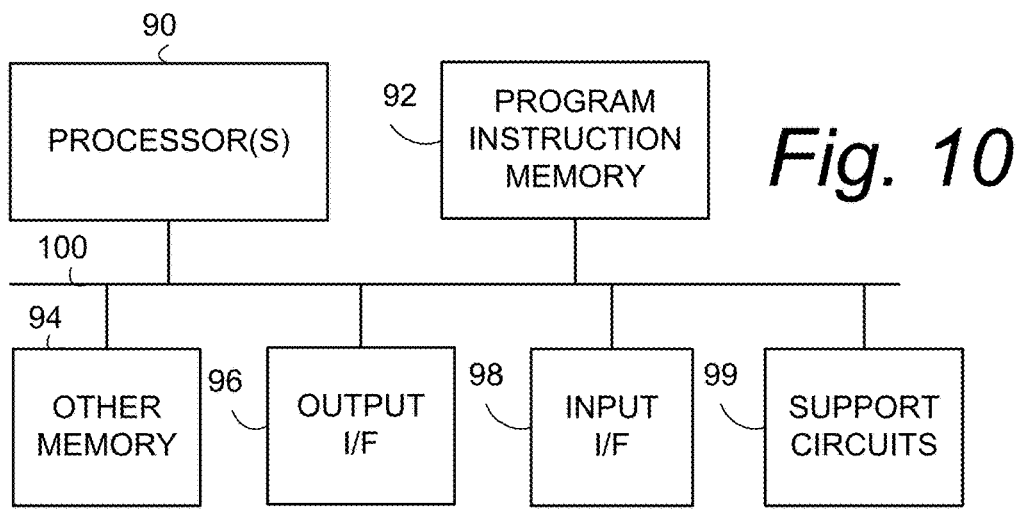
FIG. 10 is a schematic view illustrating an example embodiment of electronic circuitry that may comprise a wireless terminal capable of communicating using an unlicensed radio frequency band.

In view of its ability to operate beyond the licensed radio frequency band, wireless terminal 30 also comprises unlicensed frequency band utilization controller 40, also known as unlicensed band controller 40. The unlicensed band controller 40 comprises unlicensed band processor 42 and memory 44. The unlicensed band processor 42 may also be referred to as processor circuitry, and may be further understood in conjunction with FIG. 10 as hereinafter described. The unlicensed band processor 42 need not be dedicated to handling unlicensed band communications but may also be utilized for controlling and performing other aspects of operation of wireless terminal 30, including but not limited to licensed band communications and the execution of various applications. The unlicensed band processor 42, and other processor(s) or processing circuitry described herein, may comprise or include memory 44 as illustrated in FIG. 10, although in FIG. 3A the memory 44 is shown separately.

The unlicensed band processor 42 comprises first requirement selector 46 and rule implementor 48. In terms of unlicensed band controller 40, memory 44 comprises plural types of unlicensed band utilization requirements, including a bank of first requirements 52 and a bank of second requirements 54. The first requirement selector 46 selects, from the bank of first requirements 52, a first requirement comprising at least a first rule governing utilization of the unlicensed radio frequency band. After the first requirement is selected by first requirement selector 46, the rule implementor 48 uses a second requirement comprising at least a second rule (determined from the bank of second requirements 54) for implementing the first rule of the selected first requirement.

Figures 3B, 4B:
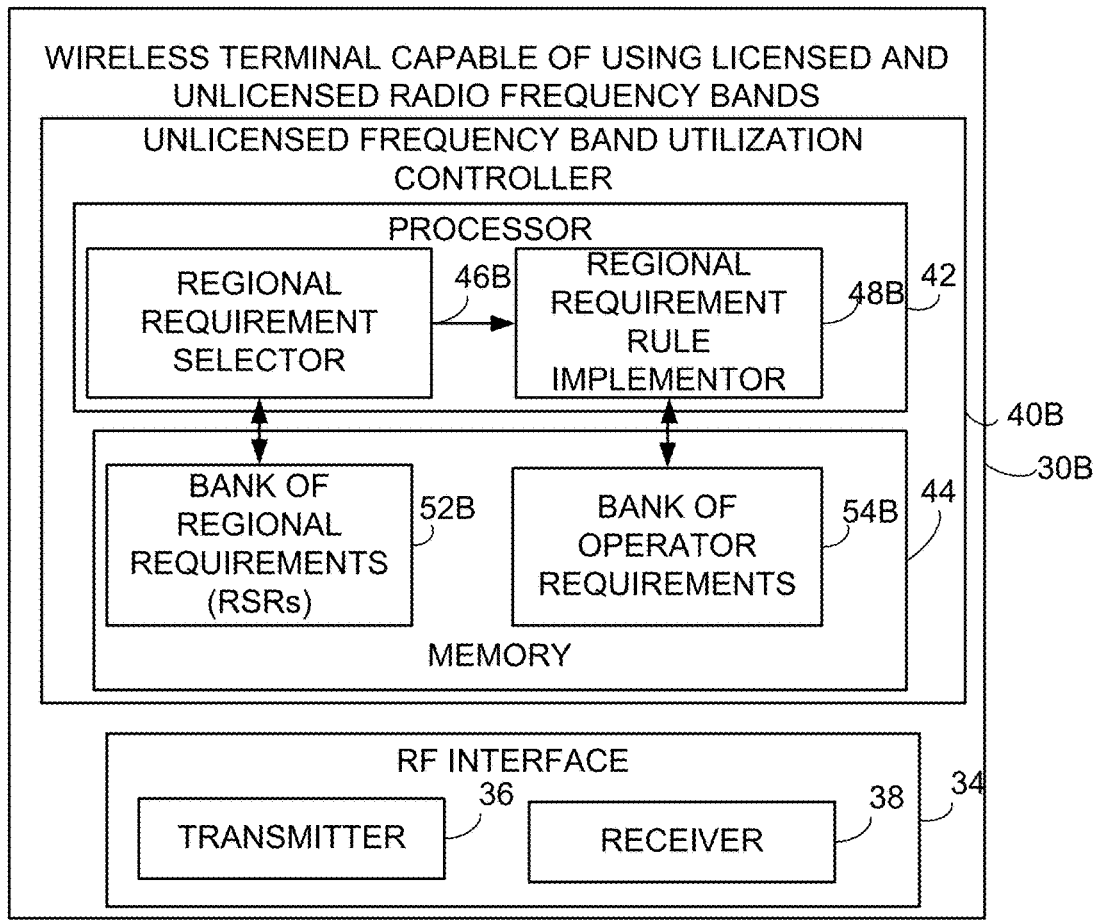
FIG. 3B is a schematic view of a wireless terminal according to an example embodiment wherein the first requirement is a regional requirement and the second requirement is an operator requirement.
FIG. 4B is a flowchart depicting basic, example acts or steps involved in an implementation of the basic method of FIG. 4A in context of the wireless terminal of FIG. 3B.

FIG. 3B shows an example specific implementation of the unlicensed band controller of FIG. 3A, referred to as unlicensed band controller 40B in FIG. 3B. In the implementation of FIG. 3B the first requirement comprises a regional requirement (also known as a regional specific requirement or "RSR") and the second requirement comprises an operator requirement (also known as an operator specific requirement or "OSR"). In accordance with these more specific monikers, the first requirement selector 46 may also be referred to as the regional requirement selector 46B; the rule implementor 48 may also be referred to as the regional requirement rule implementor 48; the bank of first requirements 52 may also be referred to as the bank of regional requirements 52B; and the bank of second requirements 54 may also be referred to as the bank of operator requirements 52B. However, any mention herein to first requirement selector 46, rule implementor 48, bank of first requirements 52, or bank of second requirements 54 should be understood as referring or applying equally to both the comparably numbered elements of FIG. 3A and FIG. 3B, whether suffixed with the alphabetical letter "B" or not.

A regional requirement (also known as a regional specific requirement or "RSR") may be defined by the regulatory body charged with managing the RF resources of a region (e.g., a government), and may pertain to the use of the RF resources by RF devices while operating in the domain of that region. For example, the first/regional requirement may be a regional requirement comprising at least a first rule governing utilization of the unlicensed radio frequency band in a geopolitical region associated with the regional requirement. For example, in the United States the Federal Communications Commission (FCC) provides rules and regulations for using the ISM bands (i.e. 2.4 GHZ and 5 GHz). The rules defined by an RSR may require that an RF device that uses the RF resources of the ISM bands must use a "Listen Before Talk" (LBT) protocol (also known as CSMA/CA) when making an initial request to access a control/data channel in the ISM band. The rules may also stipulate the maximum TX power that the RF device may use while using the RF resources of the ISM band. The rules may require that the RF device use Automated Tx Power Control Mechanisms (TPC), Dynamic Frequency Selection (DFS), emission mask, etc. The rules may be different for each unlicensed band.

The wireless terminal 30 may be configured with or otherwise have stored in its bank of regional requirements 52B multiple regional requirements (RSRs). In such case, each RSR may respectively define the rules for a specific region or geopolitical area. For example there may be a specific regional requirement (RSR) for Japan, China, Korea, USA and the EU (see, for example, Table 1). There may be multiple regional requirements (RSRs) defined for the same region, for example Japan may have a first RSR for its Northern Island and a second, different RSR for the Southern Islands. A regional requirement (RSR) may define the area for which it is applicable in various ways, such as (for example): a polygon constructed using a sequence of latitude/longitude points; a multiplicity of circles where each circle is constructed using a latitude/longitude point and a radius; network operator identification; or a combination of one or more of the foregoing.

An operator specific requirement (OSR) may be defined by the network operator with which the wireless terminal 30 has a home and when applicable (by extension) a roaming agreement. For example, the network operator may provide rules for using the ISM bands (i.e. 2.4 GHZ and 5 GHz). Such rules may allow/disallow the wireless terminal 30 to access unlicensed bands in "Stand Alone Mode" (See FIG. 2A); may provide thresholds to be compared against measurements taken on the target unlicensed band by wireless terminal 30; may require that wireless terminal 30 use Region Specific Rules regarding Tx Power limits, PTC, DFS, emission mask, etc., to access a target unlicensed band. The operator specific requirement (OSR) rules may be different for each ISM band.

The wireless terminal 30 may be configured with or otherwise have multiple operator specific requirements (OSRs) stored in its bank of operator requirements 54B. For example, each operator specific requirement (OSR) may define a different rule for a home or roaming operator. For instance, there may be a specific operator specific requirement (OSR) for a first operator (e.g., Vodafone (which may serve as a home operator for wireless terminal 30) and a different operator specific requirement (OSR) for T-Mobile (which may serve as a roaming operator for wireless terminal 30).

Thus, the wireless terminal 30 is configured with two sets of control data (e.g., two sets of requirements) upon which unlicensed band controller 40 operates for accessing unlicensed radio frequency bands. In the example implementation of FIG. 3B the first set of control data is known as the regional requirement (RSR) and the second set of control data is known as the operator specific requirement (OSR).

FIG. 4A shows representative, non-limiting example acts or steps performed by unlicensed band controller 40 of FIG. 3A in accordance an unlicensed band utilization method of an example basic mode of operation. In the basic mode of FIG. 4A act 4-1 comprises selecting a first requirement comprising at least a first rule governing utilization of the unlicensed radio frequency band. As understood from the foregoing, the first requirement is selected from bank of first requirements 52. Act 4-2 comprises using a second requirement comprising at least a second rule for implementing the first rule of the selected first requirement. As mentioned above, the second requirement is selected from the bank of second requirements 54.

An implementation of the basic method of FIG. 4A in context of the wireless terminal of FIG. 3B is shown in FIG. 4B. In the implementation mode of FIG. 4B act 4B-1 comprises selecting (from the bank of regional requirements 52) a regional requirement (RSR) comprising at least a first regional requirement rule governing utilization of the unlicensed radio frequency band. Act 4B-2 comprises using an operator requirement (OSR) comprising at least a second rule for implementing the regional requirement rule of the selected regional requirement. The operator specific requirement (OSR) may be selected from the bank of operator requirements 54.

Figure 5:
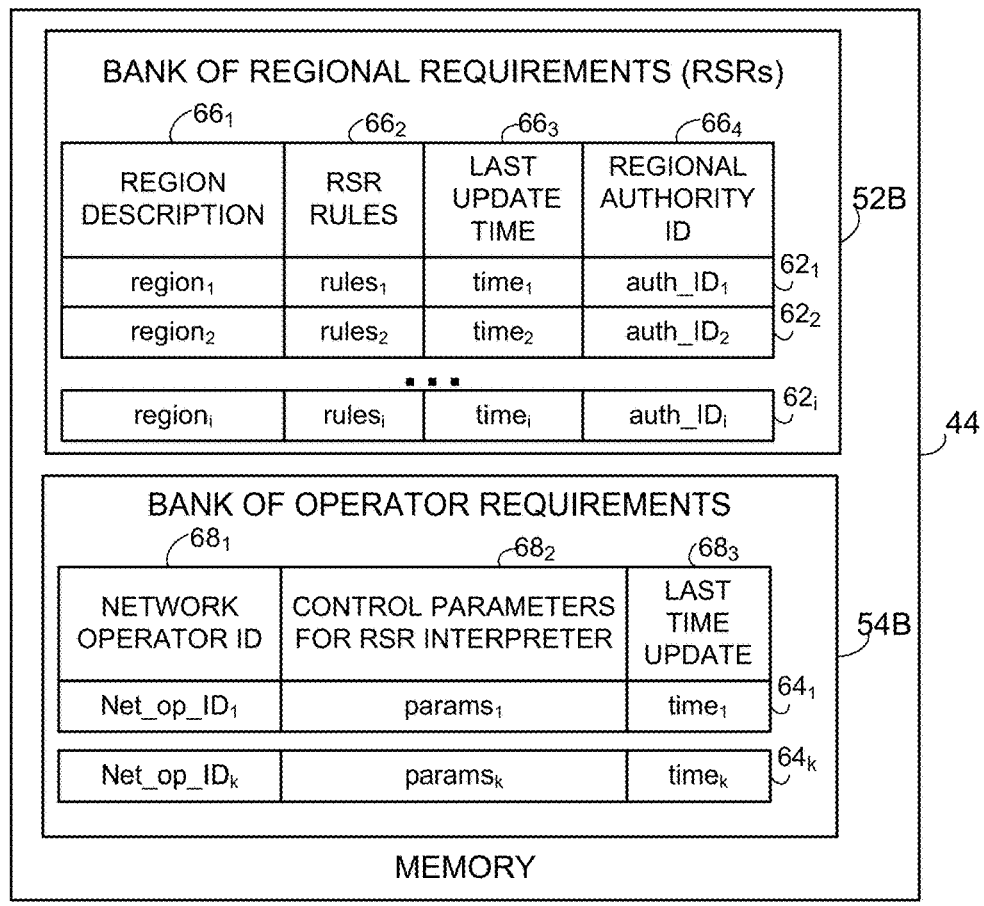
FIG. 5 is a diagrammatic view depicting example structure and contents of a memory for a wireless terminal in accordance with an example embodiment.

FIG. 5 shows in more detail an example configuration of memory 44, and particularly in the context of the implementation of FIG. 3B and FIG. 4B wherein the first requirement is a regional requirement (RSR) and the second requirement is an operator specific requirement (OSR). In the example of FIG. 5, the bank of regional requirements 52B comprises plural regional requirement objects $62_1$-$62_j$ and the bank of operator requirements 54B comprises plural operator requirement objects $64_1$-$64_k$. As shown in FIG. 5, in an example embodiment each regional requirement object 62 comprises subfields or sub-objects such as sub-objects $66_1$-$66_4$, and each operator requirement object 64 comprises subfields or sub-objects such as sub-objects $68_1$-$68_3$.

Considering first the bank of regional requirements 52B, for each regional requirement object 62 the sub-object $66_1$ defines an area, e.g., a geographical area. As indicated above, the area may be expressed as: a polygon constructed using a sequence of latitude/longitude points; a multiplicity of circles where each circle is constructed using a latitude/longitude point and a radius; network operator identification; or a combination of one or more of the foregoing. The sub-object $66_2$ defines a set of regional rules for the regional requirement object 62. The rules of sub-object $66_2$ are preferably developed by a regional authority, e.g., a governmental entity. The rules of sub-object $66_2$ are applicable to the area defined by sub-object $66_1$. The rules of sub-object $66_2$ define how an RF device (e.g., wireless terminal 30) should use the resources of an unlicensed band when operating within the area defined by sub-object $66_1$. The sub-object $66_3$ defines a time at which the regional requirement object 62 was last updated (e.g., a time-stamp). The sub-object $66_4$ comprises a unique identifier of the regional authority that defined the rules of sub-object $66_2$.

As also explained elsewhere herein, each regional requirement (RSR) may pertain to a region. The wireless terminal 30 uses its location information to determine if the wireless terminal 30 is encompassed by a region defined by a regional requirement (RSR). If the wireless terminal 30 determines that it is encompassed by the region defined by an regional requirement (RSR), then the wireless terminal 30 may further determine that it should use the rules associated with that regional requirement (RSR) in the event the wireless terminal 30 attempts to use the RF resources of unlicensed bands in that region.

Considering next the bank of operator requirements 54B, for each operator requirement object 64 the sub-object $68_1$ identifies the network operator (e.g., LTE network operator) that developed the operator specific requirement (OSR). The sub-object $68_2$ comprises control parameters for the process (e.g., rule implementor 48) that interprets the rules of the regional requirement (RSR). Such control parameters may include one or more of measurement types (e.g., received signal strength indication [RSSI], reference signal received power [RSRP], received channel power indicator [RCPI], received signal to noise indicator [RSNI] per band; measurement thresholds per band and per measurement type; measurement duration per band; and enable/disable per band. RSSI and RSRP are LTE measurements; RCPI and RSNI are Wi-Fi measurements. Thus, in an example embodiment and mode the second/operator requirement comprises a control parameter which the rule implementor 48 uses for interpreting the rule of the first/regional requirement. The sub-object $68_3$ defines a time at which the OSR was last updated (e.g., time-stamp).

Figure 6A:
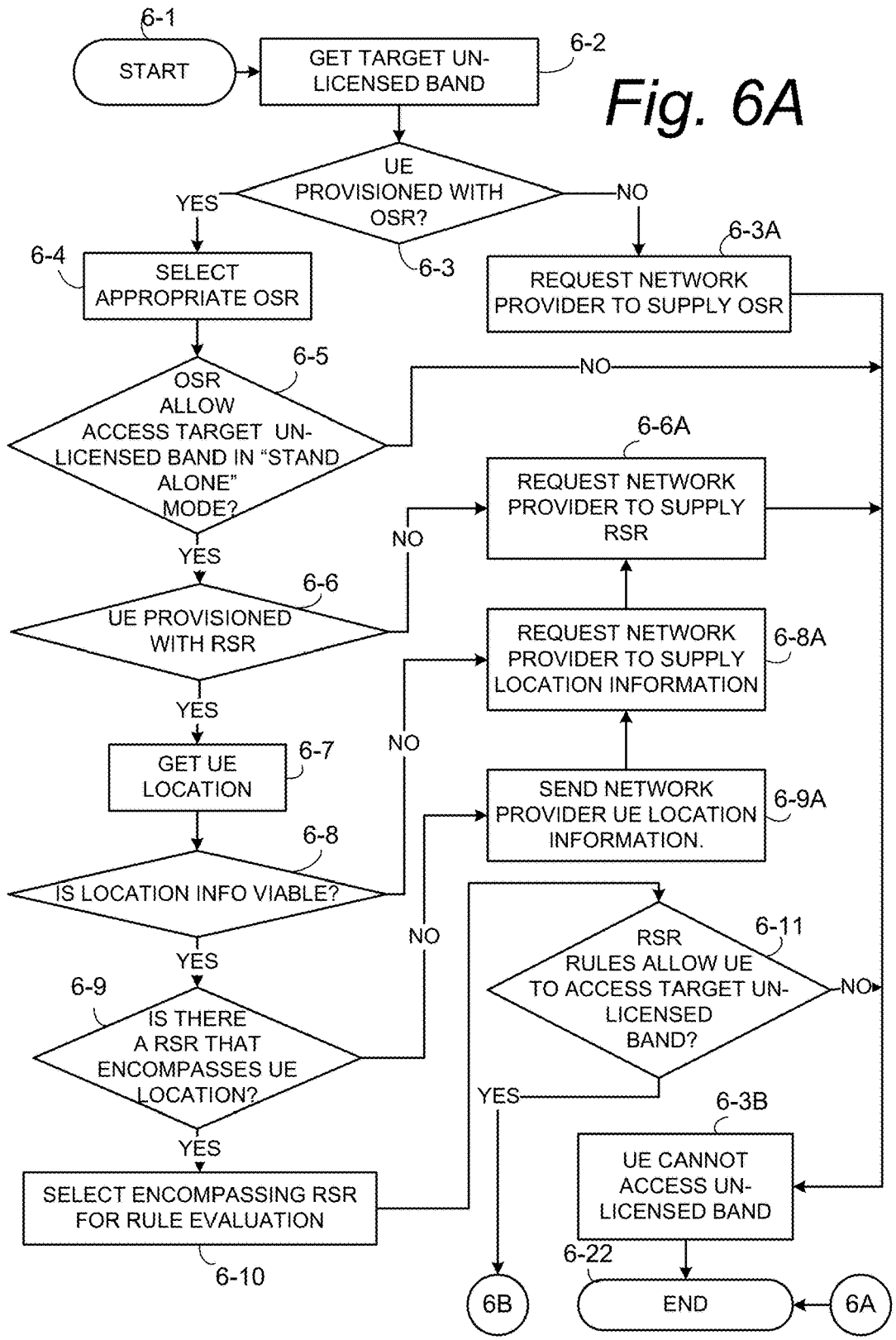
FIG. 6A and FIG. 6B are flowcharts illustrating in more detail representative acts or steps which may be performed by an unlicensed band controller for determining access to and use of an unlicensed radio frequency band.
Figure 6B:
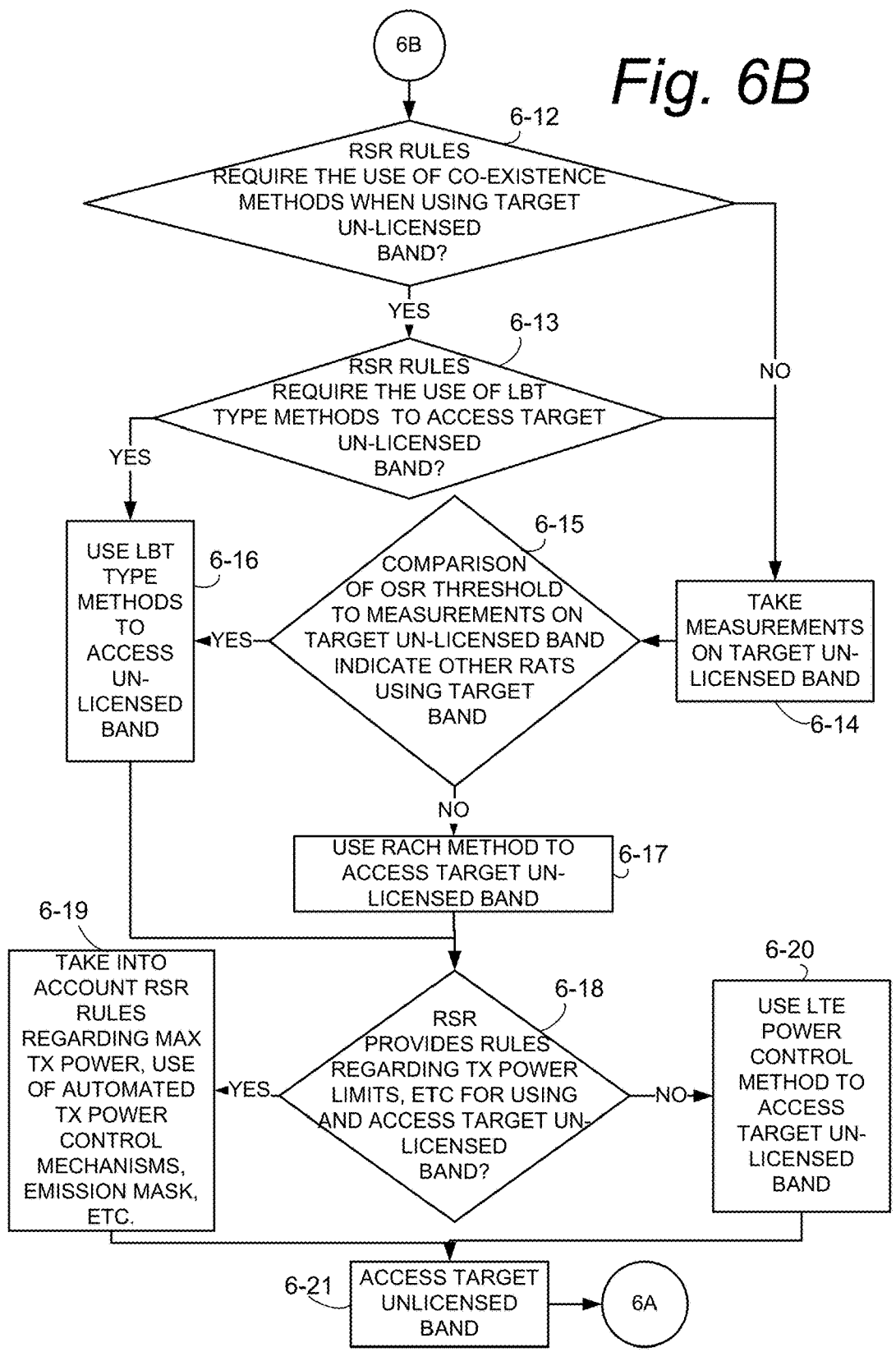

FIG. 6A and FIG. 6B, on separate sheets, illustrate in more detail a method of operating a wireless terminal 30 that utilizes an unlicensed radio frequency band. The example acts or steps of FIG. 6A and FIG. 6B are described in the context of the example implementation of the wireless terminal 30 of FIG. 3B wherein the first requirement is a regional requirement (RSR) and the second requirement is an operator specific requirement (OSR). FIG. 6A and FIG. 6B particularly illustrate acts or steps that may be performed by unlicensed band controller 40B when executing non-transient instructions stored in a memory (see FIG. 10). Flow of execution from the first sheet, i.e., FIG. 6A, to the second sheet, i.e., FIG. 6B, is indicated by connector symbol 6A; flow of execution from the second sheet, i.e., FIG. 6B, to the second sheet, i.e., of FIG. 6B, is indicated by connector symbol 6A.

FIG. 6A and FIG. 6B describe a method performed in wireless terminal 30, e.g. by unlicensed band controller 40, for resolving how the wireless terminal 30 may use the resources of an unlicensed band. The method uses wireless terminal 30 location information to select a regional requirement (RSR) (e.g., a regional requirement object 62) from a possible multiplicity of RSRs that reside in the memory 44 of wireless terminal 30, e.g., in bank of regional requirements 52B. The regional requirement (RSR) provides, e.g., in sub-object $66_2$ of regional requirement object 62, rules, defined by regional authority, regarding how RF devices (e.g., wireless terminal 30) are to access and use the resources of an unlicensed band. In an example implementation, the method process uses the home or roaming state of the wireless terminal 30 to select an operator specific requirement (OSR), e.g., a operator requirement object 64, from a possible multiplicity of ORS that reside in the bank of operator requirements 54B of memory 44 of wireless terminal 30. The operator requirement object 64 provides (in sub-object $68_2$) rules or control parameters, defined by the operator, regarding how the process is to implement the rules of the regional requirement (RSR) chosen by the unlicensed band controller 40.

The acts of FIG. 6A and FIG. 6B are described below, it being understood that the acts are illustrative and that alternative acts may instead be utilized in order to realize the intended results of the technology disclosed herein. Since FIG. 6A and FIG. 6B describe the acts as being performed with respect to a user equipment (UE), it will again be mentioned that UE and wireless terminal are used herein interchangeably.

Act 6-1 depicts a "Start" or beginning of the process, e.g., of the method implemented by unlicensed band controller 40. The method or process is entered when wireless terminal 30 determines that the wireless terminal is to access the RF resources of an unlicensed band. Such determination per se is not described herein, since how the process of FIG. 6A and FIG. 6B is notified of the determination is understood by the person skilled in the art. After act 6-1 is performed, the unlicensed band controller 40 executes various acts to further determine if, and what type of, coexistence methods should be used.

Act 6-2 comprises obtaining the unlicensed band that the wireless terminal 30 intends to attempt to access (e.g., the target unlicensed band). The band may be defined in terms of an ARFCN=Absolute radio-frequency channel number; Earfcn=Enhanced ARFCN; a starting and stopping frequency (e.g. 2110-2140 MHz); or a starting frequency and a bandwidth (e.g. 2110+30 MHz).

Act 6-3 comprises determining whether the wireless terminal 30 has not been provisioned with an operator specific requirement (OSR). If the wireless terminal 30 has not been provisioned with an operator specific requirement (OSR), then as act 6-3A the process, e.g., unlicensed band controller 40, requests the Network Provider to provide the wireless terminal 30 with an OSR at the next opportunity. Further, as a consequence, as act 6-3B the process determines that the wireless terminal 30 cannot access the unlicensed band, and the process terminates (as depicted by act 6-22).

Act 6-4 comprises the unlicensed band controller 40 selecting an appropriate operator specific requirement (OSR) from the bank of operator requirements 54.

In an example embodiment and mode the rule implementor 48 is configured to select the second requirement, e.g., the operator requirement, from a set of alternative second/operator requirements stored in a memory accessible by unlicensed band controller 40, e.g., in the bank of operator requirements 54. The rule implementor 48 chooses an appropriate operator requirement object 64 from the bank of operator requirements 54. In an example implementation the selection may be based on or associated with respective different network operators. That is, the rule implementor 48 may select the operator requirement (from the bank of operator requirements 54) in dependence on identity of a network operator having a subscription agreement concerning the wireless terminal 30. In another implementation, one or more of the plural requirements of the set of operator requirements (e.g., one or more of the operator requirement objects 64) are associated with respective different operational states of the wireless terminal relative to the network operator. In an example embodiment and mode the rule implementor 48 selects either a home operational state or a roaming operational from the set of alternative second requirements. In other words, the rule implementor 48 selects either a home or roam operator specific requirement (OSR). A home OSR and a roam OSR may be stored as separate operator requirement objects 64 in the bank of operator requirements 54B.

Figure 2A:
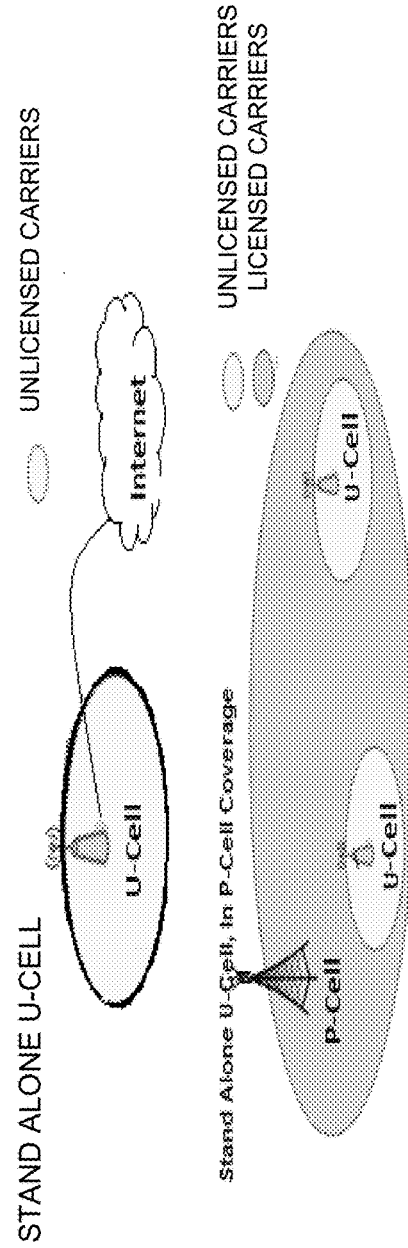
FIG. 2A and FIG. 2B are diagrammatic views of a second use case ("Stand Alone Unlicensed" case) in which a UE may, or may not, be connected to the a network, with FIG. 2A showing an unlicensed cell (U-Cell) have a connection to an operator's network and FIG. 2B showing an unlicensed U-Cell within P-cell coverage but having no direct connection (wired or wireless interface) between the U-Cell and the P-Cell.
Figure 2B:
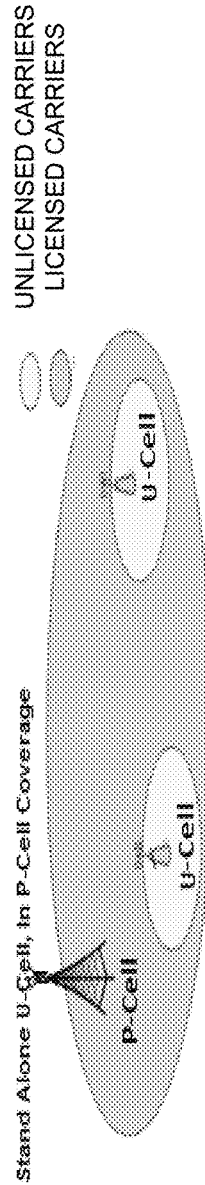

The selection of home or roam OSR may be moot if the wireless terminal 30 is not in not connected to a cellular network such as an LTE network (e.g., see FIG. 2A showing a Stand Alone U-Cell). When the wireless terminal 30 is not connected to a cellular network, the process may choose the home or roam state of the last network to which the wireless terminal 30 was connected. If the wireless terminal 30 is connected to a cellular network (e.g., see FIG. 2B showing "Stand Alone U-Cell, In P-Cell coverage"), then the process may choose the home or roam stats of the P-Cell network to which it is connected.

Act 6-5 comprises the process, e.g., unlicensed band controller 40, determining whether the applicable operator specific requirement (OSR) allows wireless terminal 30 to accesses the target unlicensed band in a "Stand Alone" method. If the determination of act 6-5 is negative, the process determines that the wireless terminal 30 cannot access the unlicensed band, and the process terminates (as depicted by act 6-22). Otherwise the process continues with act 6-6.

Act 6-6 comprises the process determining if wireless terminal 30 has been provisioned with an regional requirement (RSR). To determine if wireless terminal 30 has been provisioned with a regional requirement, the unlicensed band controller 40 checks the contents of the bank of regional requirements 52. If the determination of act 6-6 is negative, as act 6-6A the process requests the network provider to provide the wireless terminal 30 with a regional requirement (RSR) at the next opportunity. Then, since the process determines that the wireless terminal 30 cannot access the unlicensed band, the process terminates as reflected by act 6-22.

As act 6-7 the process attempts to obtain or otherwise determine the location of wireless terminal 30. The location of wireless terminal 30 may be obtained in any of several alternative or combined techniques. A first technique for obtaining or determining the location of wireless terminal 30 may be by using a Global Navigation Satellite System (GNSS). Some types of GNSS currently in service or in late stage development are GPS (Global Positioning Service), GLONASS (Russian), Beidou/Compass (Chinese), Galileo (EU), and IRNSS (India). A second technique for obtaining or determining the location of wireless terminal 30 may be by any other type of system that is terrestrially based and independent of the cellular system. Examples of such other systems include Loran-C, DECCA, Omega, Gee. A third technique for obtaining or determining the location of wireless terminal 30 may be by the use of most recent network information.

Act 6-8 comprises the unlicensed band controller 40 determining whether the location information obtained or available to the wireless terminal 30 is viable. If the determination is that the location is not viable, as act 6-8A the process requests that the network provider provide the wireless terminal 30 with location information at the next opportunity. Then as act 6-6A process requests that the network provider provide the wireless terminal 30 with a set of regional requirements (RSRs) at the next opportunity. Since the process has determined that it cannot access the unlicensed band, and the process terminates as indicated by act 6-22.

Act 6-9 comprises the unlicensed band controller 40 making a determination whether the location of the wireless terminal 30 (as obtained or determined at act 6-7) resides in a region defined by one of the sub-objects $66_1$ of the regional requirement objects 62 stored in the bank of regional requirements 52B. If the location of wireless terminal 30 does not reside in a region defined by an regional requirement (RSR), as act 6-9A the process sends to the network provider the location of wireless terminal 30 at the next opportunity. Then, as act 6-8A the process requests that the network provider provide the wireless terminal 30 with location information at the next opportunity; as act 6-6A the process requests that the network provider provide the wireless terminal 30 with a set of regional requirements (RSRs) at the next opportunity; and as act 6-22 the process terminates.

If, at act 6-9, the process were to determine that bank of regional requirements 52 include regional requirements (RSRs) from different regional authorities that cover the location of the wireless terminal 30, the unlicensed band controller 40 treats the situation as if the location of the wireless terminal 30 does not reside in any region defined by an regional requirement (RSR).

As act 6-10 the process selects the regional requirement (RSR) that encompasses the location of the wireless terminal 30 for further rule evaluation. As such, in an example embodiment the unlicensed band controller 40 selects the first requirement, e.g., the regional requirement, in dependence on location of the wireless terminal. Moreover, the unlicensed band controller 40 and particularly first requirement selector 46 selects the regional requirement from a set of alternative regional requirements (e.g., a set of alternative regional requirement objects 62) stored in a memory (e.g., in bank of first requirements 52B) accessible by unlicensed band controller 40. The plural requirements of the set of alternative first requirements, e.g., each regional requirement object 62, may be associated with respective different geographical areas. Further, in an example embodiment and mode, when plural requirements of the set of regional requirements are associated with a same geographical area, the first requirement selector 46 selects the regional requirement from a most recently updated regional requirement associated with the same geographical area. Yet further, in an example embodiment and mode when plural requirements of the set of alternative regional requirements are associated with respective different regional authorities but also a same location of the wireless terminal, the first requirement selector 46 requests that the wireless terminal be provided with an updated first requirement.

As act 6-11, a determination is made whether the RSR rules allow the wireless terminal 30 to access the target unlicensed band. If the determination of act 6-11 is negative, then as act 6-3B the wireless terminal cannot access the unlicensed band and the process is terminated (act 6-22). Otherwise, e.g., if the RSR rules do allow the wireless terminal 30 to access the target unlicensed band, processing continues with act 6-12 of FIG. 6B as shown by following connector symbols 6B.

Act 6-12, shown in FIG. 6B, comprises determining whether the RSR rules of the selected regional requirement require the use of co-existence methods when using target unlicensed band. The RSR rules of the selected regional requirement are obtained from the sub-object $66_2$ of the regional requirement object 62 corresponding to the selected RSR. If the RSR rules do not require the use of co-existence methods when using target unlicensed band, processing continues with act 6-14, described below. Otherwise, processing continues with act 6-13.

Act 6-13 comprises determining whether the RSR rules of the selected regional requirement require the use of "listen before talk" (LBT) type methods to access target unlicensed band. If it is determined at act 6-13 that the RSR rules do require the use of LBT type methods to access target unlicensed band, then processing continues with act 6-16. Otherwise, act 6-14 is performed.

Act 6-14 comprises the process taking or making measurements on the target unlicensed band. The definition of what type of measurement to make, and for how long, etc., may be defined by the control parameters of the operator specific requirement (OSR), for each band identified in the OSR as being accessible to the wireless terminal 30. As described above, in an example implementation the control parameters which are used to interpret the regional requirement (RSR) rules may be stored in sub-object $68_2$ of the applicable operator requirement object 64.

Act 6-15 comprises determining whether the OSR-defined thresholds, when compared to measurements taken on the target unlicensed band, indicate that other RATS are not using the target unlicensed band. By using a "threshold" the operator has a three state control: (1) a first state of always requiring the wireless terminal 30 to use LBT can be achieved by setting the threshold to a minimum value; (2) a second state of always requiring the wireless terminal 30 to use RACH can be achieved by setting the threshold to maximum value; and (3) a third state of directing the wireless terminal 30 to use LBT or RACH per the current usage of the RF resources by other radio access technologies (RATS) can be achieved by setting the threshold appropriately between the maximum and the minimum value.

If the determination of act 6-15 is negative, act 6-17 is performed. Otherwise processing continues with act 6-16.

Act 6-16 comprises confirming that "listen before talk" (LBT) methods can be used to access the unlicensed band. Act 6-18 is performed after act 6-16.

Act 6-17 comprises confirming that the wireless terminal 30 can access the unlicensed band using LTE RACH mechanism. Processing then continues with act 6-18.

Act 6-18 comprises the process determining whether regional requirement (RSR) rules or LTE Power Control should be used in the actual access. For example, act 6-18 checks whether the regional requirement (RSR) rules provide (e.g., include requirements or stipulations) for transmission issues such as transmit power limits, TPC, DFS, emission masks, etc. If the regional requirement (RSR) rules do include such requirements, act 6-19 is performed. Otherwise processing continues with act 6-20.

As act 6-19 the wireless terminal 30 confirms that it must take into account the RSR rules for Tx Power Control, spectrum use emission masks, etc.

Act 6-20 comprises the wireless terminal 30 confirming that the wireless terminal 30 can use LTE power control methods to access the target unlicensed band.

After execution of act 6-19 or act 6-20, the process executes act 6-21. Act 6-21 comprises access to the target unlicensed band. Thereafter the processing by unlicensed band controller 40 terminates, as indicated by following connector symbol 6A on FIG. 6B to act 6-22 of FIG. 6B.

The radio frequency (RF) interface 34 either transmits and/or receives radio frequency communications over the unlicensed radio frequency band using the first/regional rule as implemented according to the second/operator rule.

It was mentioned above in conjunction with act 6-7 that one example technique for obtaining or determining the location of the wireless terminal 30 may involve obtaining and using certain network-identifying information for the network to which the wireless terminal was most recently connected. As is well known, a mobile country code (MCC) is used in combination with a mobile network code (MNC) (also known as a "MCC/MNC tuple") to uniquely identify a mobile phone operator (carrier) using the GSM, UMTS, LTE, and iDEN public land mobile networks as well as some CDMA, TETRA, and satellite mobile networks. ITU-T Recommendation E.212 defines mobile country codes as well as mobile network codes. A wireless terminal obtains the MCC and MNC assigned to a cellular network each time it makes a connection to the cellular network. A network typically also broadcasts its MCC and MNC.

Figure 7:
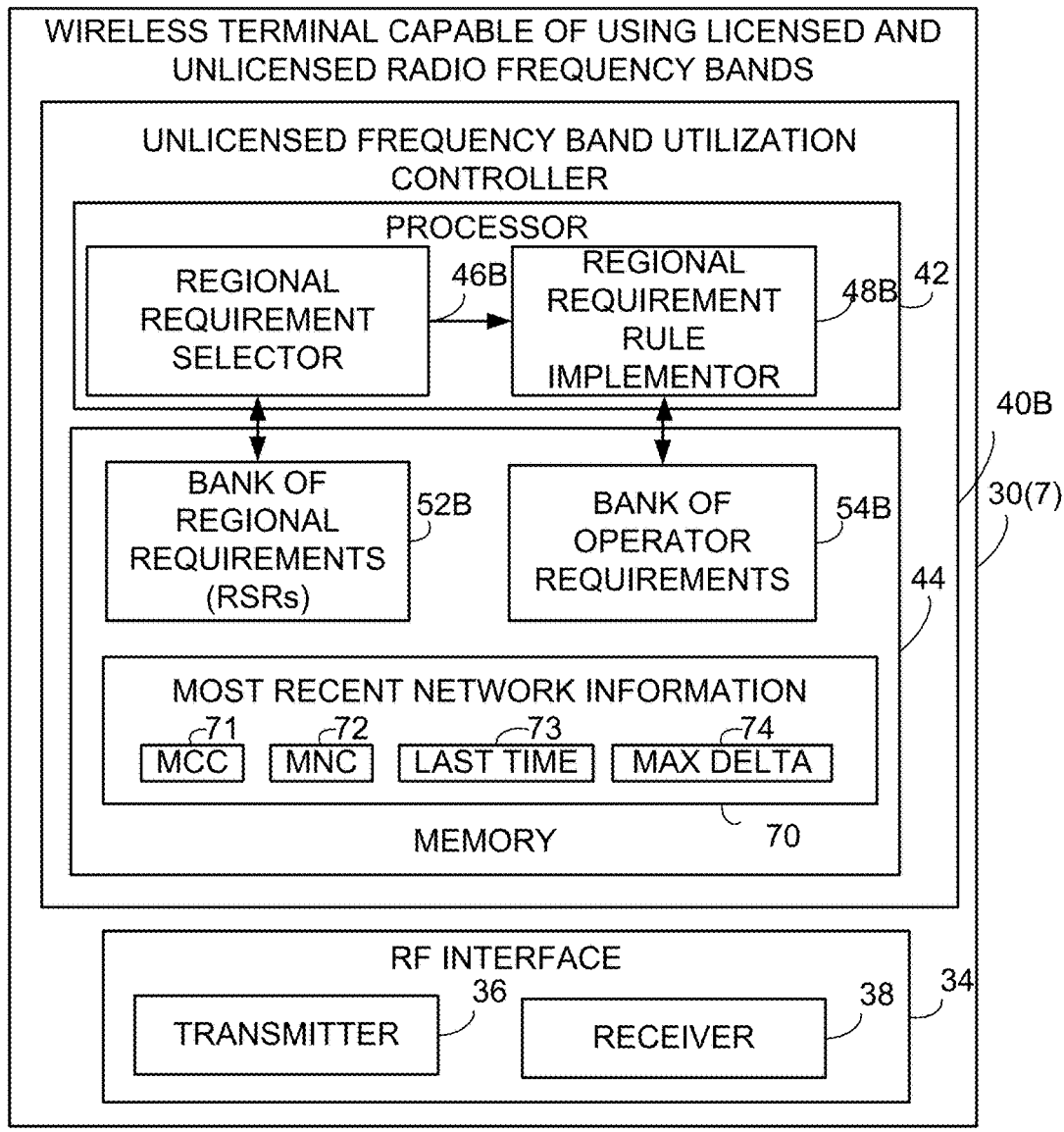
FIG. 7 is a schematic view of a wireless terminal according to an example embodiment which utilizes a first requirement and a second requirement, and wherein one or both of most recent mobile country code (MCC) and most recent mobile network code (MNC) are used to obtain or determine location of the wireless terminal.

Thus in other example embodiments illustrated by FIG. 7, FIG. 8A or FIG. 8B, one or both of MCC an MNC may be used as a technique for determining the location of wireless terminal 30 and for then determining the first requirement, e.g., regional specific requirement or "RSR", in conjunction with access to an unlicensed band. FIG. 7 shows a wireless terminal 30(7) which resembles wireless terminal 30(B) of FIG. 3B, but which additionally comprises registers or memory locations for most recent network information 70, e.g., in memory 44. As shown in FIG. 7 the most recent network information 70 may comprise a most recent mobile country code (MCC) 71 and/or a most recent mobile network code (MNC) 72, a most recent time value 73 which serves as an indicator of the time at which the most recent network information 70 was last updated, and a maximum delta time parameter 74. As understood by the person skilled in the art, the wireless terminal 30(7) may obtain the MCC and MNC assigned to a cellular network each time it makes a connection to the cellular network, or when a network broadcasts its MCC and MNC, and thus may store the most recent such values in the memory 44.

Since in the example embodiment of FIG. 7 one or both of most recent mobile country code (MCC) 71 and most recent mobile network code (MNC) 72 may be used as a technique for determining the location of wireless terminal 30, the bank of first requirements (the bank of regional requirements for the wireless terminal 30(7) may be modified to be utilized with one or both of most recent mobile country code (MCC) 71 and most recent mobile network code (MNC) 72. In other words, for the example embodiment of FIG. 7, the bank of regional requirements may be formatted or include therein one or both of MCC and MNC for plural regions, so that an attempt may be made to match the most recent mobile country code (MCC) 71 and/or the most recent mobile network code (MNC) 72 obtained by the wireless terminal 30(7) with one of plural regions having corresponding MCC and MNC stored in the bank of regional requirements.

FIG. 8A shows as bank of regional requirements 52B' a modification of the bank of regional requirements for the wireless terminal 30(7) of FIG. 7 according to one example implementation. In the example implementation of FIG. 8A, the most recent network information 70 serves as the primary way to determine the location of wireless terminal 30(7). In the example implementation of FIG. 8A, the bank of regional requirements 52B' for the wireless terminal 30(7) may be modified so that the region description sub-object $66_1$ of one or more regional requirement objects 62 is loaded with content and/or formatted to refer specifically to one or both of MCC and MNC of the corresponding region. As an example, for object $62_1$ the regional description sub-object $66_1$ includes $MCC_1$ and $MNC_1$, for object $62_2$ the regional description sub-object $66_1$ includes $MCC_1$ and $MNC_2$ (a different MNC for the same country as object $62_1$). Objects $62_1$ and $62_2$ thus illustrate that a country may have more than one mobile network code (MNC). Object $62_i$ shows the $i^{th}$ country has having $MCC_i$.

It will be understood that for the FIG. 8A implementation the acts of FIG. 6A and FIG. 6B may be performed with the location of the wireless terminal being determined primarily using network-identifying information such as most recent mobile country code (MCC) 71 and most recent mobile network code (MNC) 72.

In the above regard, act 6-7 may comprise unlicensed band controller 40 obtaining the location of wireless terminal 30(7) by fetching the most recent network information 70 from memory 40, and particularly the most recent mobile country code (MCC) 71 and/or most recent mobile network code (MNC) 72.

Act 6-8 comprises the unlicensed band controller 40 determining whether the location information obtained or available to the wireless terminal 30(7) is viable. For wireless terminal 30(7) act 6-8 may comprise the unlicensed band controller 40 comparing its current clock time with the most recent time value 73, e.g., wireless terminal 30(7)'s stored time that indicates when the wireless terminal 30(7) was lasted connected to a network, to determine a time lapse or "delta time". Act 6-8 may further comprise comparing the time lapse or "delta time" to the maximum delta time parameter 74. If the time lapse or "delta time" exceeds the maximum delta time parameter 74, the information obtained as act 6-7 based on most recent network information 70 is not considered reliable, so that act 6-8A is performed.

Act 6-9 comprises the unlicensed band controller 40 making a determination whether the location of the wireless terminal 30 (as obtained or determined at act 6-7) resides in a region defined by one of the sub-objects $66_1$ of the regional requirement objects 62 stored in the bank of regional requirements 52B. For the wireless terminal 30(7), act 6-9 comprises making a determination whether the most recent mobile country code (MCC) 71 and/or most recent mobile network code (MNC) 72 of the last network connection of the wireless terminal 30 (as obtained or determined at act 6-7) is equivalent to a MCC and MNC defined by one of the sub-objects $66_1$ of the regional requirement objects 62 stored in the bank of regional requirements 52B'. If the most recent mobile country code (MCC) 71 and/or most recent mobile network code (MNC) 72 of terminal 30(7) is not equivalent to a MCC and MNC found in the bank of regional requirements 52B', as act 6-9A the process sends to the network provider the location of wireless terminal 30 at the next opportunity. If, at act 6-9 the unlicensed band controller 40 were to determine that the bank of regions requirements 52B' include regional requirements (RSRs) from different regional authorities with the same MCC and MCC, the unlicensed band controller 40 treats the situation as if the wireless terminal 30(7) does not reside in any region defined by the regional requirements (RSR).

Thus, the method and acts of FIG. 6A are essentially fully applicable to the wireless terminal 30(7) with the understanding that the most recent network information 70 is utilized in conjunction with certain acts, as described above.

FIG. 8B shows as bank of regional requirements 52B" a modification of the bank of regional requirements for the terminal 30(7) of FIG. 7 according to another (second) example implementation. In the example implementation of FIG. 8B, the most recent network information 70 serves not as the primary information for locating the wireless terminal 30(7), but as a secondary or corroborative way of determining the location of wireless terminal 30(7). In this regard, the bank of regional requirements 52B" for the wireless terminal 30(7) may be modified so that each object 62 of the bank of regional requirements 52B" includes a further sub-object, i.e., MCC/MNC sub-object $66_5$. The MCC/MNC sub-object $66_5$ may have stored therein one or both of the MCC and MNC for each network in the region which is also identified by the region description sub-object 66 for the corresponding object 62. As an example, for object $62_1$ the MCC/MNC sub-object $66_5$ includes (1) $MCC_1$ and $MNC_1$ and (2) $MCC_1$ and $MNC_2$; for object $62_2$ the MCC/MNC sub-object $66_5$ includes $MCC_2$ and $MNC_1$. Object $62_1$ of FIG. 8B thus illustrates that a geographical region defined by region description $66_1$ may have more than one network or carrier. For example, in the United States of America where the Federal Communications Commission, a regional area may be covered by plural networks, such as Verizon, Sprint, AT&T, and accordingly there must be a MCC and MNC value in an object for such multi-carrier regions.

For the FIG. 8B implementation of wireless terminal 30(7) the acts of FIG. 6A and FIG. 6B may be performed with the location of the wireless terminal being determined, at least partially, using network-identifying information such as most recent mobile country code (MCC) 71 and most recent mobile network code (MNC) 72. Act 6-7 though and including act 6-9 are again described, but showing how the most recent network information 70 may be utilized as secondary or corroborative location information in accordance with the bank of regional requirements 52B" of FIG. 8B.

As act 6-7 the process attempts to obtain or otherwise determine the location of wireless terminal 30(7), first using a technique that does not involve most recent network information 70. A first stage or sub-act of act 6-7 may comprise obtaining or determining the location of wireless terminal 30(7) by a Global Navigation Satellite System (GNSS) or information that is terrestrially based and independent of the cellular system. A second stage or sub-act of act 6-7 comprises obtaining the location of wireless terminal 30(7) by fetching the most recent network information 70 from memory 40, and particularly the most recent mobile country code (MCC) 71 and/or most recent mobile network code (MNC) 72.

Act 6-8 comprises the unlicensed band controller 40 determining whether the location information obtained or available to the wireless terminal 30 is viable. A first stage or sub-act of act 6-8 comprises determining whether the location information obtained in the first aspect of act 6-7 is viable. If it is determined that the location information evaluated in the first stage of act 6-8 is not viable, the second stage of act 6-8 increases in importance. The second stage or sub-act of act 6-8 comprises the unlicensed band controller 40 comparing its current clock time with the most recent time value 73, e.g., wireless terminal 30(7)'s stored time that indicates when the wireless terminal 30(7) was lasted connected to a network, to determine a time lapse or "delta time". Act 6-8 may further comprise comparing the time lapse or "delta time" to the maximum delta time parameter 74. If the time lapse or "delta time" exceeds the maximum delta time parameter 74, the information obtained as act 6-7 based on most recent network information 70 is not considered reliable, so that act 6-8A is performed. If it is determined during the second stage or sub-act of act 6-8A that the most recent mobile country code (MCC) 71 and/or most recent mobile network code (MNC) 72 are also not viable, as act 6-8A the process requests that the network provider provide the wireless terminal 30(7) with location information at the next opportunity.

Act 6-9 comprises the unlicensed band controller 40 making a determination whether the location of the wireless terminal 30 (as obtained or determined at act 6-7) resides in a region defined by one of the sub-objects $66_1$ or one of the MCC/MNC sub-object $66_5$ of the regional requirement objects 62 stored in the bank of regional requirements 52B". In the latter determination, the unlicensed band controller 40 determines whether one or both of the most recent mobile country code (MCC) 71 and most recent mobile network code (MNC) 72 of the last network connection of the wireless terminal 30(7) (as obtained or determined as the second stage of act 6-7) is equivalent to a MCC and MNC defined by one of the MCC/MNC sub-object $66_5$ of the regional requirement objects 62 stored in the bank of regional requirements 52B. As mentioned above, for some regions a MCC/MNC sub-object $66_5$ may comprise MCC/MNC combinations for one more than one network, in which case all networks defined by the MCC/MNC sub-object $66_5$ should be checked. If the location of wireless terminal 30 does not reside in a region defined by an regional requirement (RSR), and if the most recent mobile country code (MCC) 71 and/or most recent mobile network code (MNC) 72 of terminal 30(7) is not equivalent to a MCC and MNC stored in a MCC/MNC sub-object $66_5$ of the bank of regional requirements 52B", as act 6-9A the process sends to the network provider the location of wireless terminal 30 at the next opportunity. If, at act 6-9, the process were to determine that bank of regional requirements 52B" includes regional requirements (RSRs) from different regional authorities that cover the location of the wireless terminal 30, or that the bank of regions requirements 52B" includes regional requirements (RSRs) from different regional authorities with the same MCC and MCC, the unlicensed band controller 40 treats the situation as if the location of the wireless terminal 30 does not reside in any region defined by an regional requirement (RSR).

Thus, the method and acts of FIG. 6A and FIG. 6B are essentially fully applicable to the wireless terminal 30(7), in either the FIG. 8A or the FIG. 8B implementation, with the understanding that the most recent network information 70 is utilized in conjunction with certain acts, as described above.

Figure 9:
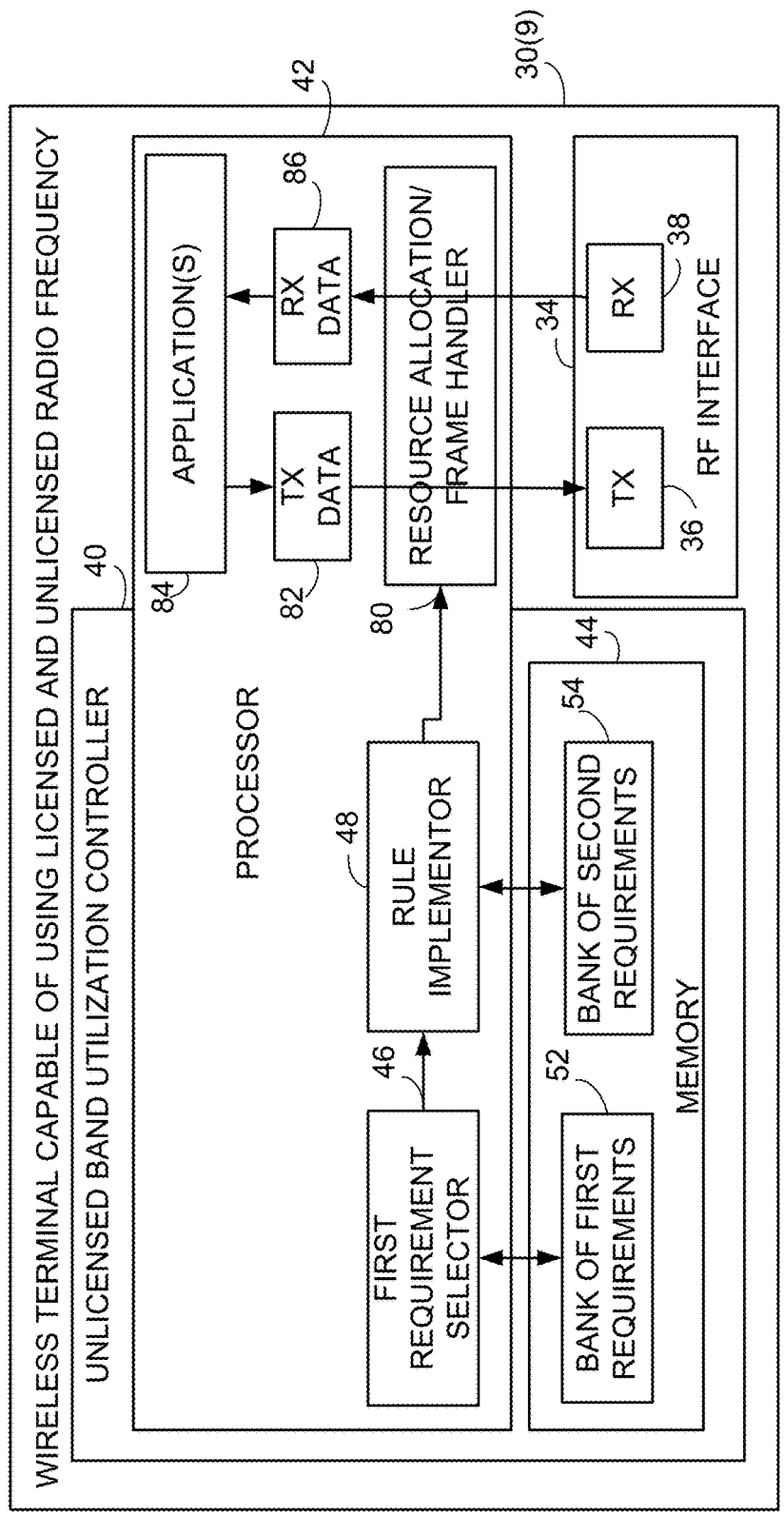
FIG. 9 is a schematic view showing in more detail various aspect of a wireless terminal in accordance with an example embodiment.

For sake of simplicity the wireless terminals 30 of FIG. 3A, FIG. 3B, and FIG. 7 were illustrated with structure and functionalities pertinent to the utilization of the unlicensed radio frequency band. FIG. 9 shows in broader context how such structure and functionalities may be implemented in an example wireless terminal 30(9). FIG. 9 particularly shows that wireless terminal 30(9) may comprise resource allocation unit or frame handler 80. The resource allocation unit/frame handler 80 determines what particular resources of the unlicensed radio frequency band are to be used for transmitting or receiving particular data. For transmission, transmit data 82 (which may be either user data or control data) obtained from one or more applications 84 executed by a processor of the wireless terminal 30 is formatted and arranged by resource allocation unit/frame handler 80 (e.g., in frames or other format) for transmission by RF transmitter 36 over an air interface, e.g., to a base station node or to another wireless terminal when in device-to-device communications. For reception, data received over RF receiver 38 (either from a base station or another wireless terminal) is deformatted or otherwise unpacked by resource allocation unit/frame handler 80, and sent as received data 86 to one or more of the applications 84.

It was mentioned above that certain units and functionalities of the wireless terminal may be implemented by processor circuitry, such as processor 42. FIG. 10 shows an example of such processor circuitry as comprising one or more processors 90, program instruction memory 92; other memory 94 (e.g., RAM, cache, etc.); input/output interfaces 96; peripheral interfaces 98; support circuits 99; and busses 100 for communication between the aforementioned units.

The memory 94, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 99 are coupled to the processors 90 for supporting the processor in a conventional manner. These circuits include cache, power supplies, clock circuits, input/output circuitry and subsystems, and the like.

Those skilled in the art will appreciate that the functions described may be implemented in one or more nodes using optical components, electronic components, hardware circuitry (e.g., analog and/or discrete logic gates interconnected to perform a specialized function, ASICs, PLAs, etc.), and/or using software programs and data in conjunction with one or more digital microprocessors or general purpose computers. Moreover, certain aspects of the technology may additionally be considered to be embodied entirely within any form of computer-readable memory, such as, for example, solid-state memory, magnetic disk, optical disk, etc., containing an appropriate set of computer instructions that may be executed by a processor to carry out the techniques described herein.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

The term "electrical signal" is used herein to encompass any signal that transfers information from one position or region to another in an electrical, electronic, electromagnetic, optical, or magnetic form. Electrical signals may be conducted from one position or region to another by electrical, optical, or magnetic conductors including via waveguides, but the broad scope of electrical signals also includes light and other electromagnetic forms of signals (e.g., infrared, radio, etc.) and other signals transferred through non-conductive regions due to electrical, electronic, electromagnetic, or magnetic effects, e.g., wirelessly. In general, the broad category of electrical signals includes both analog and digital signals and both wired and wireless mediums. An analog electrical signal includes information in the form of a continuously variable physical quantity, such as voltage; a digital electrical signal, in contrast, includes information in the form of discrete values of a physical characteristic, which could also be, for example, voltage.

Unless the context indicates otherwise, the terms "circuitry" and "circuit" refer to structures in which one or more electronic components have sufficient electrical connections to operate together or in a related manner. In some instances, an item of circuitry can include more than one circuit. A "processor" is a collection of electrical circuits that may be termed as a processing circuit or processing circuitry and may sometimes include hardware and software components. In this context, software refers to stored or transmitted data that controls operation of the processor or that is accessed by the processor while operating, and hardware refers to components that store, transmit, and operate on the data. The distinction between software and hardware is not always clear-cut, however, because some components share characteristics of both. A given processor-implemented software component can often be replaced by an equivalent hardware component without significantly changing operation of circuitry, and a given hardware component can similarly be replaced by equivalent processor operations controlled by software.

Hardware implementations of certain aspects may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

Circuitry can be described structurally based on its configured operation or other characteristics. For example, circuitry that is configured to perform control operations is sometimes referred to herein as control circuitry and circuitry that is configured to perform processing operations is sometimes referred to herein as processing circuitry.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

The technology disclosed herein provides a wireless terminal which can use radio frequency bands that are not specifically licensed for use by a cellular network (e.g., an LTE network), and which radio frequency bands which are currently used by other RATs, such as Wi-Fi, that rely on CSMA/CA. In an example embodiment and mode the technology disclosed herein provides processor circuitry which configured to select the first/regional requirement and to use the second/operator requirement for implementing the first rule of the selected first/regional requirement when the wireless terminal is not under control of a primary cell of a licensed network.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless terminal device capable of operating both in a licensed radio frequency band and an unlicensed radio frequency band, the wireless terminal device comprising:
   processor circuitry configured:
   (1) to select a first requirement comprising at least a first rule governing utilization of the unlicensed radio frequency band, and
   (2) to use a second requirement comprising at least a second rule for implementing the first rule of the selected first requirement, the second rule comprising a threshold obtained from multiple thresholds received in a Radio Resource Control (RRC) message, wherein the multiple thresholds include a first threshold value and a second threshold value, the second threshold value being greater than the first threshold value, and when using the second rule;
   to perform a listen-before-talk (LBT) with respect to the unlicensed radio frequency band when the obtained threshold is the first threshold value;
   to perform a random access procedure (RACH) rather than the listen-before-talk (LBT) for the unlicensed radio frequency band when the obtained threshold is the second threshold value; and
   transceiver circuitry configured:
   to perform the listen-before-talk (LBT) protocol on the unlicensed radio frequency band in dependence on the obtained threshold; and, if the listen-before-talk (LBT) protocol indicates that a resource of the unlicensed radio band is idle,
   to perform a transmission on the resource of the unlicensed radio frequency band.

2. The wireless terminal of claim 1, wherein the processor circuitry is configured to select the first requirement in dependence on location of the wireless terminal.

3. The wireless terminal of claim 1, wherein the processor circuitry is configured to select the first requirement in dependence on location of the wireless terminal, and wherein the location of the wireless terminal is determined based on most recent network information including one or both of most recent mobile country code (MCC) and most recent mobile network code (MNC).

4. The wireless terminal of claim 3, wherein the processor circuitry is configured to use the most recent network information as a primary information for determining the location of the wireless terminal.

5. The wireless terminal of claim 3, wherein the processor circuitry is configured to use the most recent network information as a corroborative way of determining the location of wireless terminal.

6. The wireless terminal of claim 1, wherein the processor circuitry is configured to select the first requirement from a set of alternative first requirements stored in a memory accessible by the processor circuitry, and wherein plural requirements of the set of alternative first requirements are associated with respective different geographical areas.

7. The wireless terminal of claim 6, wherein when plural requirements of the set of first requirements are associated with a same geographical area, the processor circuitry is configured to select the first requirement from a most recently updated first requirement associated with the same geographical area.

8. The wireless terminal of claim 6, wherein the plural requirements of the set of alternative first requirements are defined by respective regional authorities which govern unlicensed frequency band usage in the respective different geographical areas.

9. The wireless terminal of claim 1, wherein the processor circuitry is configured to select the first requirement from a set of alternative first requirements stored in a memory accessible by the processor circuitry; and, wherein, when plural requirements of the set of alternative first requirements are associated with respective different regional authorities but also a same location of the wireless terminal, the processor is configured to request that the wireless terminal be provided with an updated first requirement.

10. The wireless terminal of claim 1, wherein the first requirement is a regional requirement comprising at least the first rule governing utilization of the unlicensed radio frequency band in a geopolitical region associated with the regional requirement and wherein the second requirement is a network operator requirement.

11. The wireless terminal of claim 1, further comprising a transceiver configured to transmit and/or receive radio frequency communications over the unlicensed radio frequency band using the first rule as implemented according to the second rule.

12. The wireless terminal of claim 1, wherein the processor circuitry is configured to select the first requirement and to use the second requirement for implementing the first rule of the selected first requirement when the wireless terminal is not under control of a primary cell of a licensed network.

13. A method in wireless terminal device capable of operating both in a licensed radio frequency band and an unlicensed radio frequency band, the method comprising:
    obtaining a Radio Resource Control (RRC) message;
    obtaining a threshold from multiple thresholds based on the RRC message, wherein the multiple thresholds include a first threshold value and a second threshold value, the second threshold value being greater than the first threshold value;
    performing a listen-before-talk (LBT) with respect to the unlicensed radio frequency band when the obtained threshold is the first threshold value;
    performing a random access procedure (RACH) rather than the listen-before-talk (LBT) for the unlicensed radio frequency band when the obtained threshold is the second threshold value; and
    if the listen-before-talk (LBT) is successful, performing a transmission utilizing a resource of the unlicensed radio frequency band.

14. A wireless terminal device comprising:
    processor circuitry configured:
        to obtain a Radio Resource Control (RRC) message;
        to obtain a threshold from multiple thresholds based on the RRC message, wherein the multiple thresholds include a first threshold value and a second threshold value, the second threshold value being greater than the first threshold value;
        to perform a listen-before-talk (LBT) with respect to the unlicensed radio frequency band when the obtained threshold is the first threshold value;
        to perform a random access procedure (RACH) rather than the listen-before-talk (LBT for the unlicensed radio frequency band when the obtained threshold is the second threshold value; and
    transceiver circuitry configured to perform, if the listen-before-talk (LBT) is successful, a transmission utilizing a resource of the unlicensed radio frequency band.

15. The wireless terminal of claim 14, wherein the obtained threshold is a measurement threshold.

16. The method of claim 13, wherein the obtained threshold is a measurement threshold.

17. The method of claim 13, further comprising performing the listen-before-talk (LBT) with respect to the unlicensed radio frequency band in dependence on the obtained threshold.

18. The method of claim 13, further comprising:
    performing either the listen-before-talk (LBT) access protocol or the random access channel procedure (RACH) with respect to the unlicensed radio frequency band;
    upon completion of either the listen-before-talk (LBT) access protocol or the random access channel procedure (RACH), utilizing a resource of the unlicensed radio frequency band for a radio transmission.

\* \* \* \* \*